Jan. 17, 1950 — E. L. SCHOFIELD — 2,494,672
SAFETY LATCH MEANS FOR AUTOMOBILES
Filed April 25, 1947 — 5 Sheets-Sheet 1
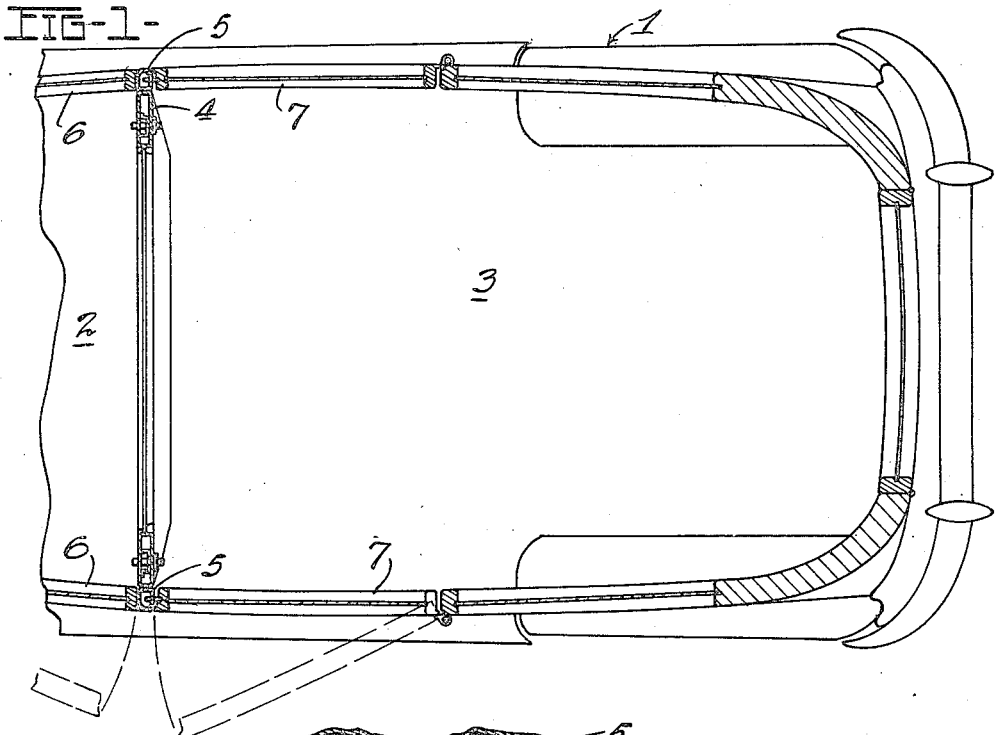
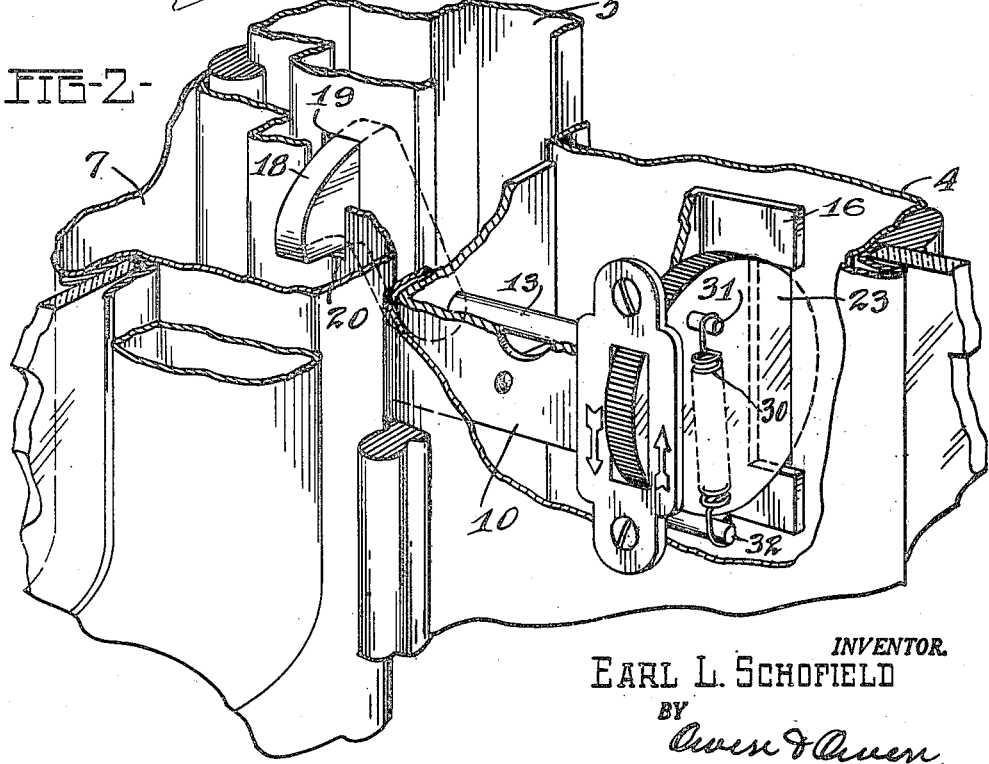
INVENTOR.
EARL L. SCHOFIELD

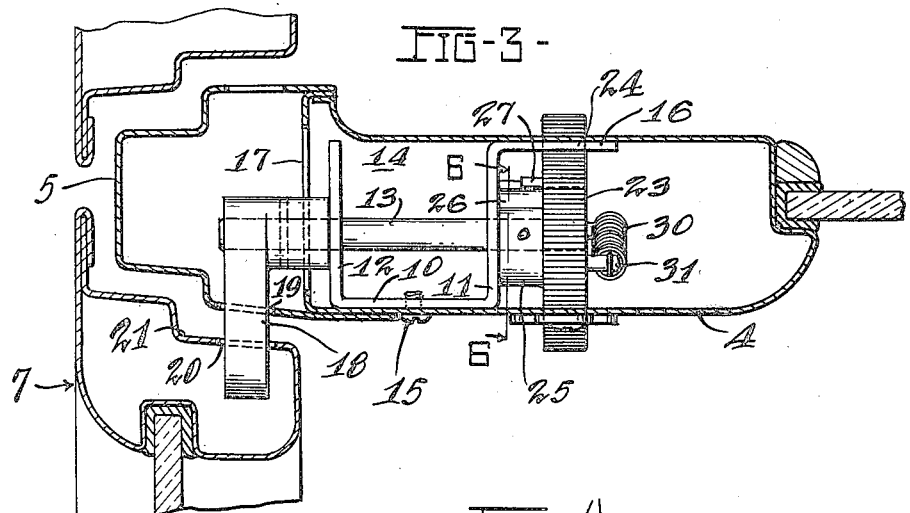
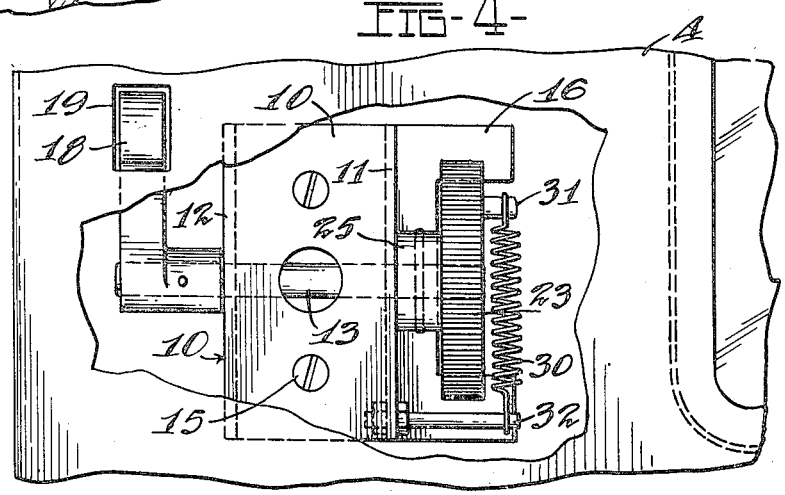
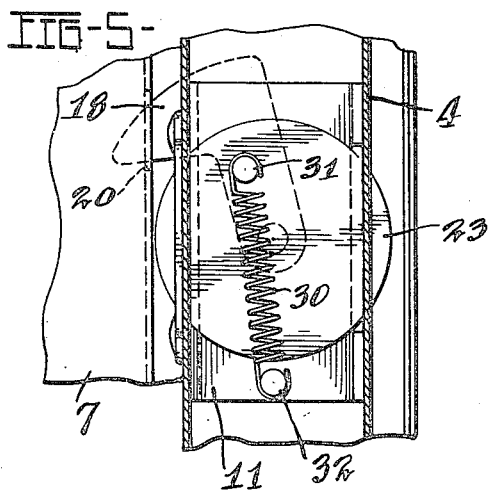
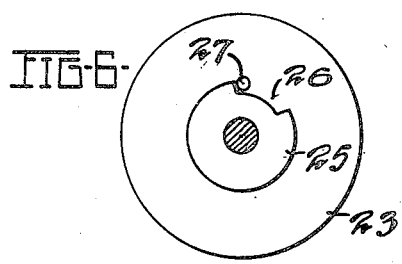

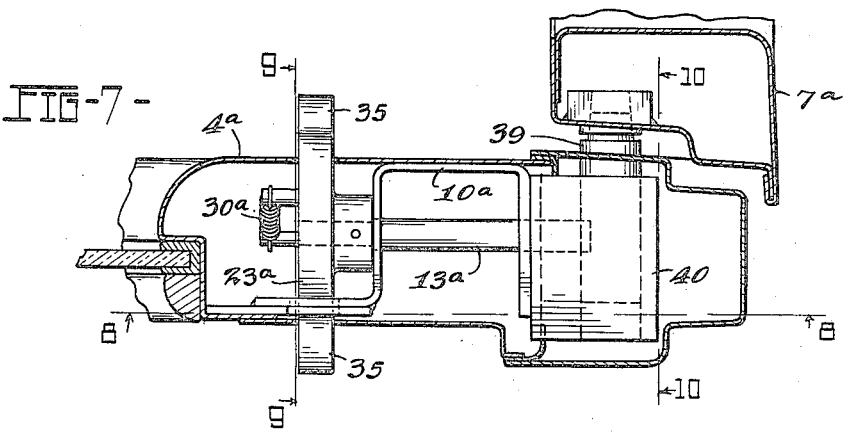
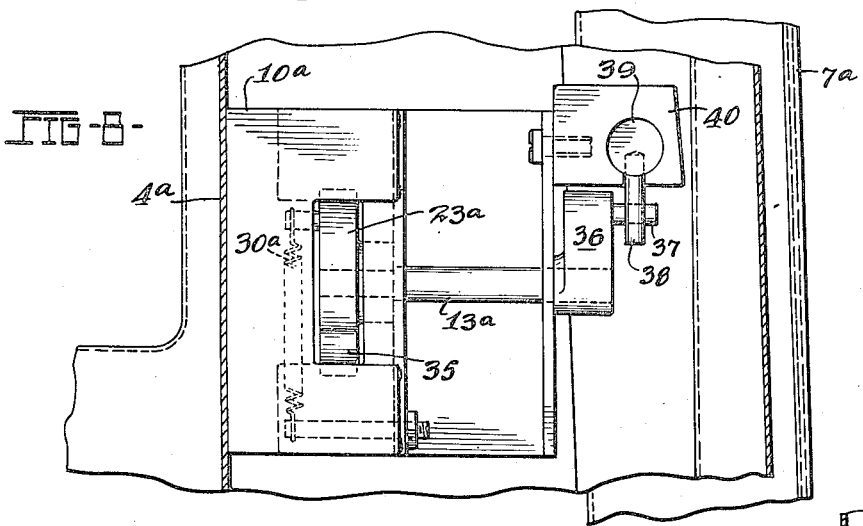
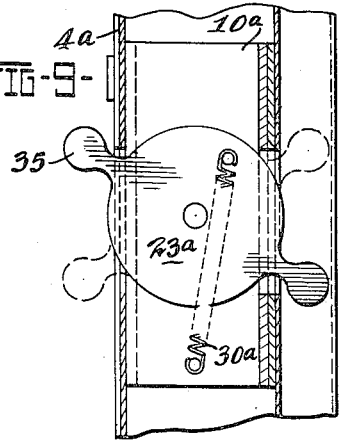
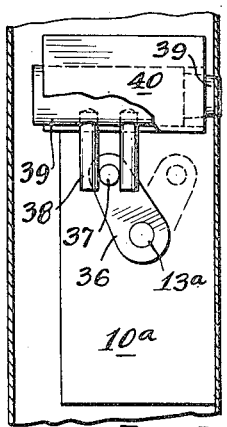

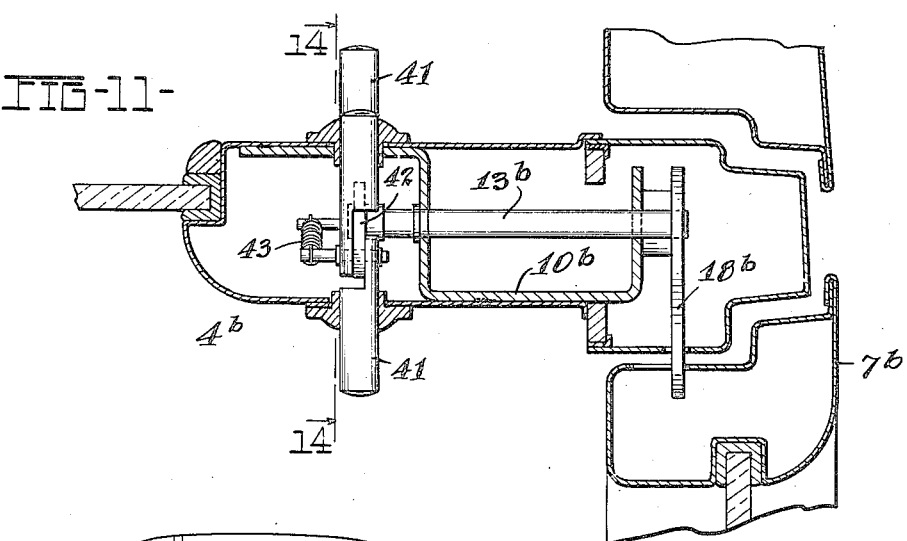
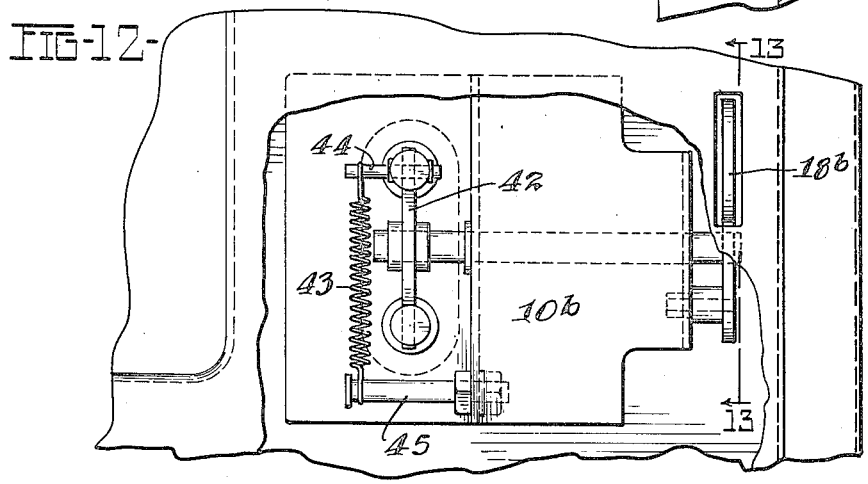
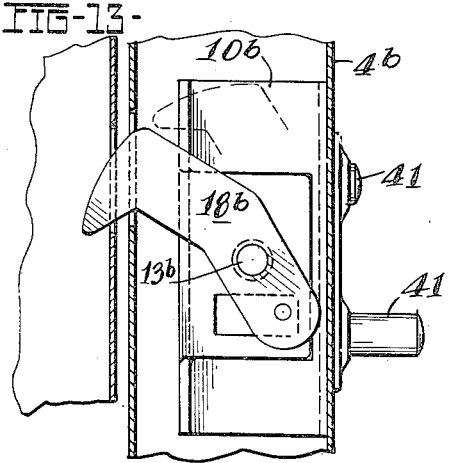
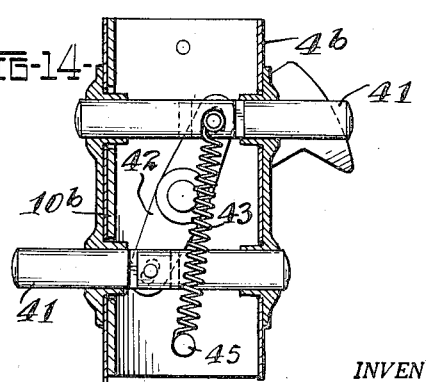

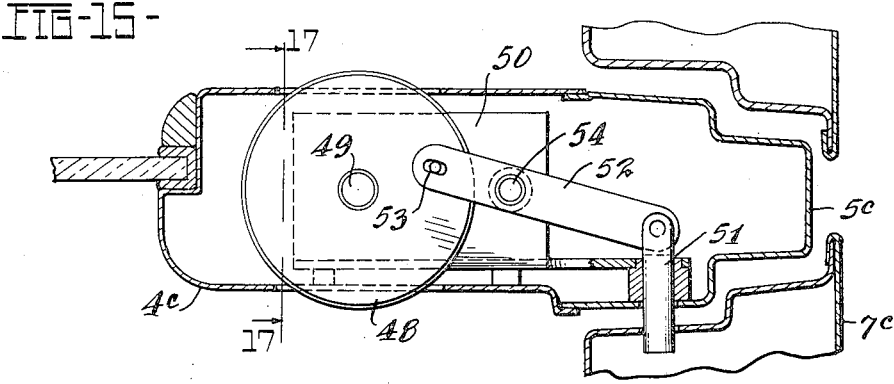
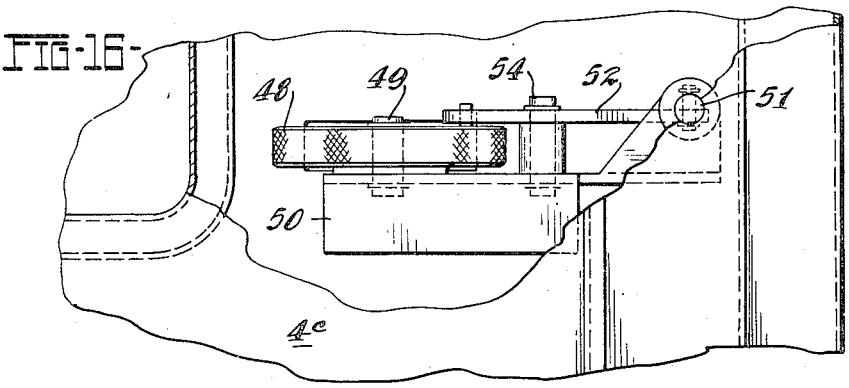
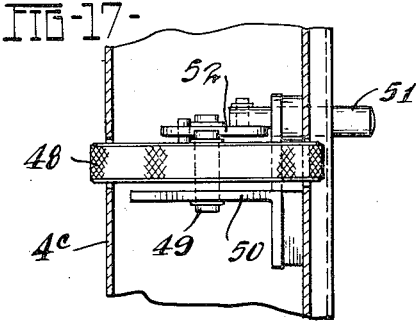
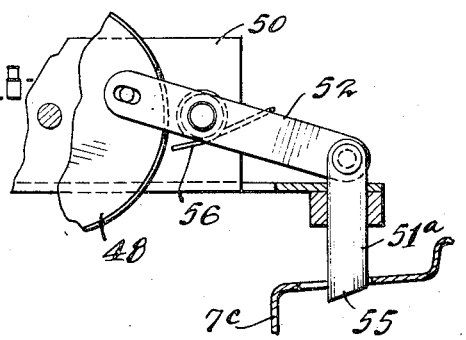

Patented Jan. 17, 1950

2,494,672

UNITED STATES PATENT OFFICE 2,494,672

SAFETY LATCH MEANS FOR AUTOMOBILES

Earl L. Schofield, Rockford, Ill., assignor to Superior Coach Corporation, Lima, Ohio, a corporation of Ohio Application April 25, 1947, Serial No. 743,782

10 Claims. (Cl. 296—16)

1

This invention relates to safety or emergency locking means for vehicle doors and more particularly for use in connection with the side doors of invalid and funeral cars.

It is customary in such cars to provide a compartment at the rear of the driver's compartment for use of the invalid and attendants and in case of a funeral car for receiving the casket, and to provide a side door at one or both sides of the rear compartment which opens rearwardly and closes at its free edge against and latches to the partition pillar located between the two compartments. This pillar is usually common to the free edges of the respective side doors that close the front and rear compartments. It is found in practice that a side door for the rear compartment frequently remains unlatched when closing and, without noticing this, the vehicle is started, causing a rearward swinging of the door and very often injury to it and the vehicle. Should a front door remain unlatched, it is not so serious, as the door not only swings rearwardly in closing but the unlatched condition is likely to be noticed by the driver or other person riding in the front seat.

The primary object of the invention is the provision of a safety locking means for the side doors of the rear compartments of invalid or funeral cars, which means is easily and conveniently controlled from the interior of preferably both the front and rear compartments, whereby to prevent accidental opening of such doors and to enhance the commercial value of the vehicles.

This application is filed as a continuation-in-part of my application for patent Serial No. 680,133, filed June 28, 1946, now abandoned.

Further objects and advantages of the invention will be apparent from the following detailed description and from the accompanying drawings illustrating one embodiment thereof, in which—

Fig. 1 is a fragmentary horizontal section of a vehicle body equipped with the invention; Fig. 2 is an enlarged perspective view of a fragmentary portion of the vehicle including the invention, with parts broken away and with the locking means in door-locking position; Fig. 3 is an enlarged horizontal fragmentary section of the same showing the locking means in plan; Fig. 4 is a side view of the locking means; Fig. 5 is an inner end view thereof; Fig. 6 is an inner side view of the control wheel with its shaft and stop pin in section; Fig. 7 is a section similar to Fig. 3, except reversed in position, of a modified form of the invention; Figs. 8, 9 and 10 are sections on the lines 8—8, 9—9 and 10—10 in Fig. 7;

2

Fig. 11 is a section similar to Fig. 7 showing another form of the invention; Fig. 12 is a side elevation of the partition and side pillar shown in Fig. 11, with a portion of the casing broken away; Fig. 13 is a section on the line 13—13 in Fig. 12; Fig. 14 is a section on the line 14—14 in Fig. 11; Fig. 15 is a section similar to Fig. 7 of still another form of the invention; Fig. 16 is a side view of the partition in Fig. 15 with a portion of the casing broken away; Fig. 17 is a section on the line 17—17 in Fig. 15, and Fig. 18 is a fragmentary showing of a slight modification of the form shown in Fig. 15.

Referring to the drawings, 1 designates a funeral or invalid type of vehicle body having a front compartment 2 for the driver, a rear compartment 3 for receiving a casket or invalid cot, an interior or cross partition 4 separating said compartments, and a partition pillar 5 against which the side doors 6 and 7 close.

A door 6 closes each side opening of the front compartment and swings rearwardly in closing while a door 7 closes each side opening of the rear compartment and swings forwardly in closing. The locking means embodying the invention is mounted in the partition 4 adjacent to a pillar 5 and projects into the pillar and has locking coaction through an opening in the pillar with the associated rear door 7 when in closed position.

This locking means comprises a frame 10, in the present instance of U-form, with its legs 11 and 12 perforated to form bearing openings for the shaft 13. This frame is mounted in an opening or hollow portion 14 of the partition 4 adjacent to the pillar 5 with its legs horizontally spaced and its loop portion attached to the casing portion of the partition by screws 15, or in any other suitable manner. The frame leg 11, which is the one more remote from the pillar 5, has a flange 16 projecting outwardly at right angles from its terminal end and bearing flatwise against the inner side of the respective casing wall of the partition 5, which casing wall is opposed to the one to which the frame loop is fixed.

The shaft 13 is journaled horizontally in the frame legs 11, 12, and projects at its outer or forward end into the adjacent pillar 5 through an opening 17 in its inner side and carries at such end a latch finger 18 adapted to be swung, by a turning of the shaft, through a registering opening 19 in a side of the pillar 5 and into locking engagement with the free edge of an associated door 7 through an opening 20 in its lock pillar 21.

The opposite or inner end of the shaft 13 projects from the frame leg 11 toward the center of the partition and has a control wheel 23 fixed to such end and of sufficient diameter for its periphery to project through registering openings in both the opposing side casing walls of the partition so as to expose the wheel for manual control at both sides of the partition. This wheel is peripherally knurled or serrated to increase frictional resistance of a turning pressure applied thereto. The wheel also projects through an opening 24 in the frame flange 16 disposed at one side of the wheel axis. The wheel 23 at its inner side with respect to the frame is provided with a hub 25 having a peripheral arcuate notch 26 concentric to the wheel axis and receiving a stop pin 27 projecting from the frame leg 11. This limits the extent of swinging of the latch finger in releasing and engaging directions.

The latch control parts are yieldingly held in one or the other of their limit-throw positions by a coiled contractile spring 30 anchored at one end to a pin 31 on the control wheel located radially outward from the longitudinal center of the notch 26 and at its other end to a pin 32 projecting from the frame 10 outwardly from the wheel periphery at the opposite side of its axis to the pin 31. The spring 30 is in diametric or dead center position with respect to the wheel axis when the pin 27 is midway between the ends of the notch 26 and acts to quickly throw the control to one limit position or the other of its movement when the spring pull is past such dead center position in the direction of throw and to yieldingly hold it in such limit position.

In the form shown in Figs. 7 to 10, the control parts and mountings therefor are the same as in Fig. 3, except that the control wheel 23ª has ears 35 projecting from its periphery at diametrically opposite points, and the shaft 13ª at its latch end is provided with an upwardly extending crank arm 36 with a wrist pin 37 projecting therefrom and engaging loosely between a pair of pins 38 projecting downwardly from the side of a latch bolt 39. This bolt is mounted for reciprocatory movements in a guide 40 fixed to the outer side of the U-frame 10ª in the partition 4ª and when projected enters a recess in the free edge of the door 7ª when in closed position, as shown in Fig. 7. A spring 30ª acts to yieldingly retain the control parts and bolt in either released or engaged position the same as the spring 30 in Fig. 3.

In the form shown in Figs. 11 to 14, the parts and their operation are the same as in Fig. 3, except that push buttons 41 are substituted for the control wheel 23. These push buttons are in two pairs with one pair projecting forward and rearward through the respective sides of the partition 4ᵇ in this form and connected at their inner ends to the upper end of a cross arm 42 on the control shaft 13ᵇ, and with the other pair projecting in the same manner from the lower end of said arm. Rocking the shaft in one direction will throw the connected latch 18ᵇ to door-engaging position and rocking it in the other direction will throw the latch to released position. The shaft is yieldingly held in either position of its throw by a coiled contractile spring 43 that is attached at one end to a pin 44 which connects the upper pair of push buttons to the cross arm and has its opposite end anchored to a fixed pin 45 on the frame 10ᵇ.

In the form shown in Figs. 15 to 18, the control wheel 48 is mounted in horizontal position on a stub shaft 49 and has its periphery exposed through openings in opposite sides of the casing which forms the partition designated 4ᶜ to be operated from either the front or rear compartment of the vehicle. The shaft 49 rises from a horizontal frame or bracket 50 mounted within the partition. A door-engaging bolt 51 is reciprocally mounted in a side of the door pillar 5ᶜ for engagement, when projected, with the door 7ᶜ to hold it in closed position. A lever member 52 is disposed in a plane parallel to the plane of rotation of the wheel 48 with one end lapping the wheel and in pin and slot connection therewith, as at 53, its other end pivotally connected to the inner end of the bolt 51, and with its fulcrum 54 fixed to the frame 40 and disposed between said connected parts. The control wheel 48, the bolt 51 and the lever 52 are thus movable in the same or parallel planes so that the bolt will be projected or retracted by reverse rocking movements of the wheel.

In Fig. 18 the arrangement is the same as in Fig. 15, except that the outer end of the bolt, marked 51ª, is beveled, as at 55, and the lever 52 is biased by a spring 56 to cause the bolt to normally stand in projected position. The bevel of the bolt is such that it will be caused to move inward against the tension of the spring 56 when struck by the edge of a door 7ᶜ when closing.

It is apparent that in each form of the invention a bolt or latch means is employed to lock the rear side door of an associated vehicle in closed position, and that the control of the locking means may be effected from either side of the cross partition dividing the front and rear compartments of the vehicle. Also that control movements of the manual control means are communicated to the locking means through an intermediate rocking connection which, in each of the forms shown in Figs. 3, 7 and 11, comprises a rock shaft, and in each of the forms shown in Figs. 15 and 18 comprises a lever type of rocker member.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a vehicle, a side door, a cross partition, a side pillar at an end of said partition against which the door closes and having inner and side openings therein, a shaft supported by said partition and projected into said pillar through the inner opening, a latch fixed to the shaft within the pillar and operable through the side opening therein to have locking engagement with the door or to release it, and control means on the shaft operable from both sides of said partition to impart door-engaging or releasing movements to the latch through said shaft.

2. In a vehicle having a side pillar, a side door closing thereagainst, and a partition extending interiorly of the vehicle from the pillar, a latching means for the door including a shaft mounted horizontally in said partition and projecting into the pillar, a latch member on said shaft operable by a turning thereof to lock the door in closed position or to release it for opening, and a control member on said shaft exposed without a side of said partition and operable to impart rocking movements to the shaft.

3. In a vehicle having a cross partition dividing the vehicle into two compartments, a side pillar at an end of said partition, and a side door for one of said compartments closing against said pillar, means for locking the door in closed position including a latch finger mounted for rocking movements to engage or release the door and having its rocking axis disposed interiorly of said pillar, and a control for said latch finger exposed to either of said compartments and operable therefrom to impart rocking movements to the finger.

4. An arrangement as called for in claim 3, together with spring means acting on said control to quickly shift it from a predetermined position either to fully released or door-locking position.

5. In a vehicle having a cross partition dividing the vehicle into two compartments, a side pillar at an end of said partition, and a side door for one of said compartments closing against said pillar, locking means for the door mounted in said partition and having a latch member disposed in said pillar and operable through a side of the pillar and into the lock pillar of the door to lock the door in closed position, a horizontal shaft mounted in the partition and projecting into said pillar and carrying said latch member, a hand wheel mounted on the shaft crosswise of the partition with its periphery exposed through both sides of the partition for manual operation from either compartment, stop means permitting limited rocking movements of the control member and shaft to place the latch member in door locking or fully released position, and spring means acting on the wheel interiorly of the partition to move it quickly either to fully released or to locking position from a position central of the permissible movement of the wheel.

6. In a vehicle having a side door, a cross partition and a side pillar at an end of said partition against which the door closes, a reciprocally movable latch member for the door mounted in a side of said pillar, a rotatable control mounted in the partition and exposed to operation from either side thereof, and a lever fulcrumed intermediate said control and latch in connection with each and operable by movements of the control in one direction or the other to impart projecting or retracting movements to the latch.

7. An arrangement as called for in claim 6 together with means acting on the lever to normally bias it in projected position, said latch having a beveled end to permit snap engagement of the door therewith.

8. In a vehicle, a side door, a side pillar against which the door closes, a cross partition extending from said pillar and dividing the vehicle into front and rear compartments, said partition having spaced side walls with an opening in each to the respective compartment, a latch mounted in the pillar for engagement with the door to hold it closed, a movable manual control in said partition having parts exposed to both said compartments through said side openings for operation in either compartment, and a connection in said partition and pillar between said control and latch operable by predetermined movements of said control to release the latch from the door.

9. In a vehicle, a side door, a side pillar against which the door closes, a cross partition extending from said pillar and dividing the vehicle into front and rear compartments, said partition having spaced side walls with an opening in each to the respective compartment, a latch mounted in the pillar for engagement with the door to hold it closed, a rockable manual control in said partition having parts exposed to both said compartments through said side openings for operation in either compartment, the rocking axis of said control being parallel to the partition sides, and a connection in said partition and pillar between said control and latch operable by predetermined movements of the control to release the latch from the door.

10. In a vehicle, a side door, a side pillar against which the door closes, a cross partition extending from said pillar and dividing the vehicle into front and rear compartments, said partition having spaced side walls with an opening in each to the respective compartment, a latch mounted in the pillar for engagement with the door to hold it closed, a rockable manual control in said partition having manually engageable parts projecting through both said openings for operation in either compartment, a shaft rockable by said control and operable when rocked in one direction to release said latch from the door, said shaft being mounted within the partition between its side walls and extending transverse of the vehicle, and yielding means acting to normally retain said latch, control and shaft in door-locking positions.

EARL L. SCHOFIELD.

REFERENCES CITED

The following references are of record in the file of this patent:

UNITED STATES PATENTS

| Number | Name | Date |
| --- | --- | --- |
| 558,226 | Stivers | Apr. 14, 1896 |
| 1,943,581 | Butler | Jan. 16, 1934 |
| 2,145,982 | Henning | Feb. 7, 1939 |